US006656333B2

(12) United States Patent
Lee et al.

(10) Patent No.: US 6,656,333 B2
(45) Date of Patent: Dec. 2, 2003

(54) PROCESS FOR MAKING PATTERNED MAGNETIC RECORDING MEDIA EMPLOYING A NONFUNCTIONAL LUBRICANT

(75) Inventors: Jean Ling Lee, San Jose, CA (US); Jing Gui, Fremont, CA (US)

(73) Assignee: Seagate Technology LLC, Scotts Valley, CA (US)

(*) Notice: Subject to any disclaimer, the term of this patent is extended or adjusted under 35 U.S.C. 154(b) by 1 day.

(21) Appl. No.: 10/108,293

(22) Filed: Mar. 26, 2002

(65) Prior Publication Data

US 2003/0129455 A1 Jul. 10, 2003

Related U.S. Application Data

(60) Provisional application No. 60/347,035, filed on Jan. 9, 2002.

(51) Int. Cl.[7] .............................. C23C 14/34; B08B 3/00; B05D 5/12; G03C 5/00; A61N 5/00
(52) U.S. Cl. ............................ 204/192.16; 204/192.12; 134/34; 427/131; 427/331; 427/407.1; 430/320; 250/492.3
(58) Field of Search ..................... 204/192.12, 192.15, 204/192.16; 134/34; 427/131, 331, 407.1; 250/492.3; 430/320

(56) References Cited

U.S. PATENT DOCUMENTS

| 5,135,772 A | * | 8/1992 | Garrison ...................... 427/11 |
| 5,587,217 A | | 12/1996 | Chao et al. ................. 428/65.4 |
| 6,194,048 B1 | * | 2/2001 | Hatakeyama et al. ....... 428/65.4 |
| 6,231,676 B1 | | 5/2001 | Rudd et al. ..................... 134/1 |
| 6,331,364 B1 | | 12/2001 | Baglin et al. ............. 428/694 T |
| 2001/0033453 A1 | | 10/2001 | Belser et al. ............. 360/77.03 |
| 2001/0036030 A1 | | 11/2001 | Sacks et al. .................. 360/75 |

OTHER PUBLICATIONS

Ausimont Montedison Group; Fomblin PFPE: Lubricants, 4 pages, modified Jul. 27, 2000.

* cited by examiner

Primary Examiner—Steven H. VerSteeg
(74) Attorney, Agent, or Firm—Moser, Patterson & Sheridan LLP

(57) ABSTRACT

A magnetically patterned hard disk is made by sputtering the magnetic layers, sputtering the carbon layer, applying a nonfunctional lubricant, buff/wiping the disk to remove sputtering debris and asperities, removing the nonfunctional lubricant using a standard degreasing process, applying and patterning a resist, and thereafter subjecting the exposed disk to inert ion irradiation.

8 Claims, 1 Drawing Sheet

PROCESS FOR MAKING PATTERNED MAGNETIC RECORDING MEDIA EMPLOYING A NONFUNCTIONAL LUBRICANT

CROSS-REFERENCE TO RELATED APPLICATIONS

This application claims benefit of U.S. provisional patent application Ser. No. 60/347,035, filed on Jan. 9, 2002, which is herein incorporated by reference. The present application is related to U.S. patent application publication number 2001/0036030 A1, published in Nov. 1, 2001 and assigned to common assignee Seagate Technology LLC, which is hereby incorporated by reference.

BACKGROUND OF THE INVENTION

1. Field of the Invention

The invention relates to field of disk drives and more particularly to the writing of processes for making patterned media.

2. Description of the Related Art

As disk drive areal density continues to increase, media pre-patterned during manufacturing has been proposed to "pre-record" servo information, to provide magnetic isolation of the tracks, or to even provide isolated magnetic "bits." For example, U.S. Pat. No. 6,331,364 B1, describes forming isolated regions corresponding to bits in magnetic media by exposing a special alloy of iron platinum ($Fe_{55}Pt_{45}$) to ion irradiation with 700 keV N+ (or alternatively, helium, argon, neon, krypton or xenon) ions at doses of $2\times10^{14}$ to $2\times10^{15}$ ions/cm². The ion bombardment is said to make the exposed material "soft," i.e., the exposed material has less coercivity and is less able to retain magnetic remanence. The described process irradiates the media either through patterned non-contact stencils, or through patterned resist formed on the media. In either case, the patterning process is performed after the magnetic layers are deposited through a sputtering process—but before the conventional protective sputtered carbon overcoat and functional lubricant layers are applied.

One problem presented by patterning the media prior to depositing the protective carbon overcoat and is that the media is potentially exposed to contaminants, particularly oxidants, which can lead to corrosion and eventual failure of the disk. This problem is particularly acute when a patterned resist is used in the patterning process. The resist must be applied and/or removed outside the evacuated chamber in which the disk was sputtered. Further, the resist is typically removed using a chemical solvent. Both exposed to disk to contaminants.

If one employs non-contact stencils for patterning masks, such as disclosed in the '364 patent, it may be possible to conduct the patterning process without removing the disk from the same sputtering environment. This reduces the contamination problem involving airborne contaminants. However, because the stencils is not directly contacting the disk, the feature size achievable using a stencil is significantly less than the feature size achievable by patterning through a contact resist. As areal density continues to increase, there is a need to develop a "clean" resist patterning process.

An additional problem in the '364 patterning process is presented by sputtering debris. This debris is characterized by very large asperities essentially composed of the material being sputtered. Unless this debris is removed prior to subsequent patterning process steps, the debris will cause localized failure of patterning. If severe enough, the disk will fail quality tests and will have to be scrapped.

Therefore, there is a need for a patterning process that permits the use of resist in the patterning process and that also provides for the removal of sputtering debris prior to patterning.

SUMMARY OF THE INVENTION

The invention comprises a process for making a patterned media disk including the steps of sputter-depositing one or more magnetic layers; sputter-depositing a protective overcoat layer; applying a lubricant on the protective overcoat layer; buff/wiping the lubricated disk to remove debris; and exposing the magnetic disk to an effective amount ion radiation through a mask to reduce magnetic remanence in selected portions of the disk.

In the one embodiment, the mask is a patterned resist applied to a carbon-overcoated disk after the buff/wiping lubricant has been removed. After ion irradiation, the resist is removed and a conventional functional lubricant is thereafter applied. The buff/wiping lubricant must be removed prior to resist deposition; otherwise the resist cannot be effectively applied.

In order that the buff/wiping lubricant be removable, a nonfunctional lubricant, preferably perfluoropolyether or polyphenoxytriphosphazene, is employed. This lubricant can be completely removed using a low-cost conventional degreasing process employing conventional solvents.

The protective carbon overcoat may be single or multiple layers of amorphous diamond-like carbon. It may further be hydrogenated or nitrogenated. In order that the carbon not be adversely affected by chemical reaction with the ions of the ion irradiation step, inert irradiation ions are employed. The ions are caused to impact the disk with a kinetic energy substantially less than 100 keV. This energy is insufficient to adversely affect the carbon overcoat, but is sufficient to reduce the remanence of the magnetic layers in proper dosages.

The carbon layer protects the magnetic layers during processing steps that occur once the disk has been removed from the sputtering chamber. It permits the use of a buff/wiping step prior to subsequent patterning steps. The lubricant prevents the disk from being scratched by the debris.

Alternatively, if a non-contacting stencil is used as the mask, a functional lubricant may be used prior to the buff/wiping step. The functional lubricant is preferably a perfluoropolyether lubricant having one or more functional groups and may be the lubricant conventionally used to lubricate finished magnetic disks for hard disk drives.

DESCRIPTION OF THE PREFERRED EMBODIMENTS

Figure 1:
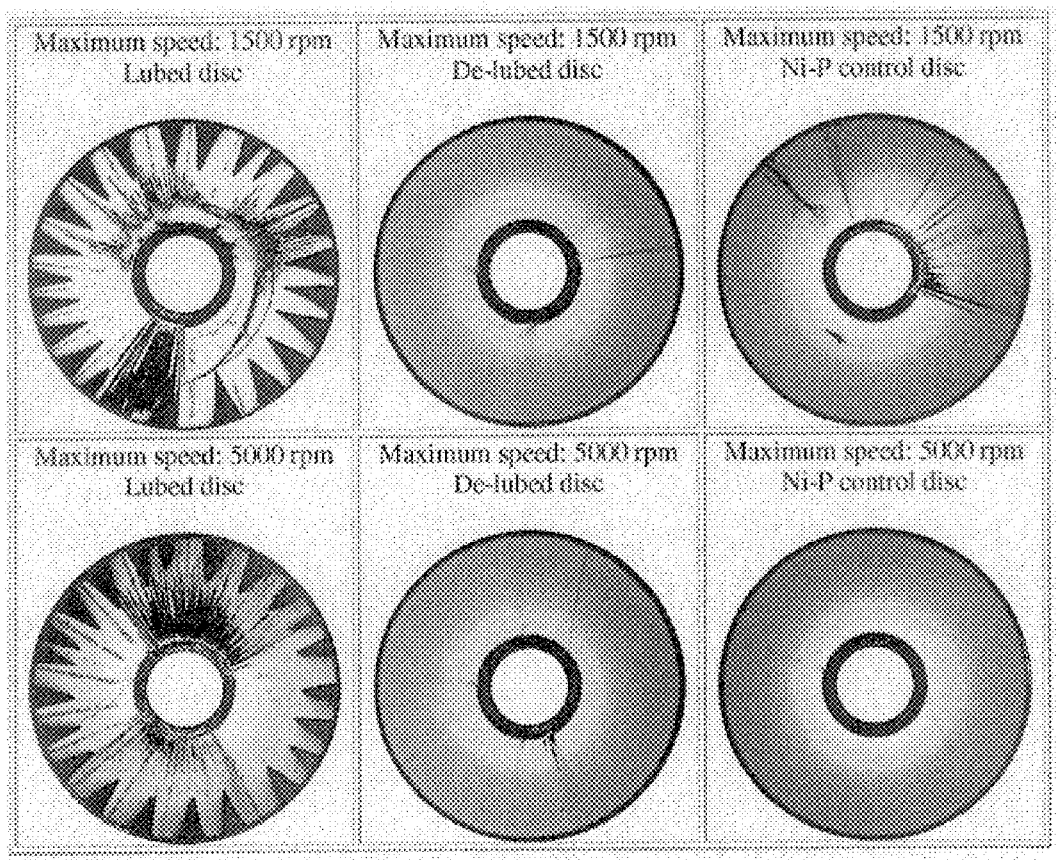
FIG. 1 is a 2 by 3 set of illustrations of a spin coated resist on a magnetic disk at two different rotational velocities. In the first row, the disks are shown spun at 1500 rpm. In the second row, the disks are shown spun at 5000 rpm. In the first column, the resist is shown spun on a lubricated disk. In, the second column, the resist is shown spun on a disk lubricated according to present invention. In the third column, the resist is shown spun on an unlubricated control disk comprising a nickel-phosphorus coated substrate.

Prior methods for forming patterned media using ion bombardment techniques bombarded the disk step after formation of the magnetic layers but prior to the deposition of the sputtered carbon overcoat. See, for example, U.S. Pat. No. 6,331,364 B1. That patent taught the use of nitrogen ions and the bombardment energy as 700 keV. Nitrogen, especially when it impacts carbon at these energies, may chemically react with the carbon atoms in the carbon overcoat to form so-called "nitrogenated" carbon. As well, even inert ions impacting the carbon overcoat at this energy may also adversely affect the chemical properties of the carbon, for example, by changing the ratio of sp2, sp3 and sp-4 carbon. Regardless, it is highly undesirable to change the properties of the carbon overcoat to any significant degree.

The carbon overcoat layer is critical to protecting the magnetic layers from contaminants after the disk has been removed from the sputtering chambers. These contaminants, particularly oxidants, can lead eventually to corrosion, disk and, therefore, disk drive failure.

The carbon overcoat also protects the disk from abrasions. This, in combination with a lubricant, permits the use of a convention buff/wiping step prior patterning. The buff/wiping step removes sputtering debris, which is an artifact of known mass production sputtering processes. Neither the carbon nor the lubricants alone are sufficient to sufficiently protect the magnetic layers from abrasion during a buff/wipe step. They must be used in combination.

Commonly used functional perfluoropolyether lubricants (e.g., FOMBLIN® Z-DOL and Z-tetraol, available from Ausimont USA, a subsidiary of Montedison S.P.A of Milan, Italy) are conventionally used as lubricants for magnetic disks. They are also the preferred lubricants used in a conventional buff/wipe after the disks are sputtered. However, such as lubricants cannot be used when later resist must be applied because a lubricated surface has a low surface energy. Such a surface is difficult to wet with a typical resist material. FIG. 1 illustrates the problem.

FIG. 1 illustrates six disk images after resist spin coating. The left column shows the resist as applied to a lubricated disk. In the top left illustration, the resist was applied with the disk rotating at 1500 rpm. In the bottom left illustration, the resist was applied at 5000 rpm. Both illustrations demonstrate a significant lack of resist adherence. Such a resist cannot be used for a patterning process. This indicates that the lubricant must be removed prior to resist application.

Because of strong interactions (bonding) with the disk surface, functional lubricants are hard to completely remove from the surface using conventional solvent processes. As a result, these lubricants frequently leave a residue on the disk surface even after the disk is subjected to a solvent cleaning (de-greasing) process. This residue prevents a uniform distribution of resist on the disk surface during the resist-coating step.

In order that the lubricant be removable using a conventional solvent degreasing process, the disk must be lubricated with a nonfunctional lubricant prior to the resist coating step plate. A non-functional lubricant differs from conventional disk lubricants such as Z-DOL in that it does not possess functional end groups that allow it to bond strongly with the underlying disk media. A non-functional lubricant can be completely removed from the disk surface by a conventional solvent cleaning processes. Both vapor and dip stripping methods may be used.

A preferred processing sequence includes lubricating the disk with a non-functional lubricant such as FOMBLIN® Z, available from Ausimont USA, a division of Montedison, S.p.A., of Milan Italy. The next up includes subjecting the disk to a buff/wipe process for debris removal. Next, the disk is degreased using a solvent cleaning process. Because the lubricant is a nonfunctional lubricant, it is entirely removed by the solvent decreasing process.

A preferred vapor degreasing process uses vapors of VERTREL® XF, available from E.I. du Pont de Nemours and Company, Inc, of Wilmington, Del. The lubricated disk is exposed to the vapors for a time sufficient to completely remove the lubricant. For most disks, the lubricant may completely be removed in approximately one minute.

There are many choices of effective non-functional lubricants. For example, non-functional perfluoropolyether lubricants such as FOMBLIN® Z (Z03, ZIS, Z25, Z60), available from Ausimont USA, KRYTOX, available from E.I. du Pont de Nemours and Company, Inc., Wilmington Del., and Demnum S (520, S65, 5100, S200), available from Daikin Kogyo Co., Japan, may be used. As well, phosphazene lubricants such as polyphenoxytriphosphazene, better known as X-1P, available from The Dow Chemical Co., Midland, Mich., can also be used.

EXAMPLE

The disks illustrated in the center column of FIG. 1, were first lubricated with 16 Å of FOMBLIN® Z-15, degreased and then spin coated with resist at both 1500 (top) and 5000 (bottom) rpm respectively. The degreasing process consisted of subjecting the disks for one minute to vapors of VERTREL® produced by boiling.

For both spin speeds shown in FIG. 1, the resist coating on the de-lubricated disks compared very favorably to the two control disks illustrated in the right-most column. (The control disks were unlubricated nickel-phosphorus-coated substrates.) This indicates that the resist coating was satisfactory for use in a patterning process.

Alternative Embodiment

To the extent that a stencil approach to patterning magnetic disks remains viable from an areal density point of view, the magnetic disks may be processed to completion by sputtering the magnetic and carbon layers and lubricating them using a conventional functional lubricant. The disks are then subjected to a conventional buff/wipe to remove sputtering debris and asperities. Thereafter, a noncontact stencil is applied and the disk is subjected to the ion irradiation process to pattern the magnetic remanence of the disk.

In either embodiment, the ion irradiation step consists of subjecting the exposed disk to inert ions, such as argon, helium, neon, krypton and xenon, having a preferred kinetic energy of 35 keV and a dosage of $3E15$ ions/cm$^2$. The kinetic energy may range from 10 to 50 keV. The dosage may range from $1E13$ to $1E16$ ions/cm$^2$.

The carbon overcoat layer may be any of those conventionally used in the manufacture of magnetic disks for hard disk drives. These include carbon overcoat layers having various degrees of sp2, sp3 and sp4 carbon, having hydrogenated or nitrogenated carbon, having multilayers, or any combination of the foregoing.

The above discussion of the preferred embodiments is illustrative only. Each of the steps in the disclosed embodiments may be varied by those skilled of the art using equivalent process steps or equivalent lubricants and solvents. As well, the ion irradiation step may be varied with the primary limitation being that ion irradiation not adversely affect the carbon overcoat so that it no longer performs its protective function. To the extent that the disk is lubricated with a functional lubricant and a stencil is used instead of a resist, the ion irradiation step additionally should not adversely affect the chemical properties of the functional lubricant. If however, the functional lubricant is adversely affected, the functional lubricant may be reapplied after the ion irradiation step. Alternatively, a nonfunctional lubricant and degreasing step may also be employed prior to the use of the stencil.

We claim:

1. A process for making a patterned media disk, comprising;

sputter-depositing one or more magnetic layers onto a media disk substrate;

sputter-depositing a protective overcoat layer;

applying a lubricant on the protective overcoat layer;

buff/wiping the lubricated disk to remove debris;

removing the lubricant; and exposing the media disk to an effective amount of ion radiation to reduce magnetic remanence in selected portions of the disk.

2. The process according to claim 1 wherein the lubricant is a nonfunctional lubricant.

3. The process according to claim 2 wherein the nonfunctional lubricant is selected from the group consisting of perfluoropolyether nonfunctional lubricants and polyphenoxytriphosphazene non-functional lubricants.

4. The process according to claim 1 wherein the exposing step includes applying a resist to the surface of the disk, patterning the resist, and thereafter exposing the disk to radiation through the patterned resist.

5. The process according to claim 1 wherein the protective overcoat comprises carbon.

6. The process according to claim 1 wherein the exposing step comprises irradiating the media disk with inert ions having a kinetic energy and a range of 10 to 50 key with a total dosage of 1E13 to 1E16 ions/cm2.

7. The process according to claim 6 wherein the inert ions have a kinetic energy of 35 keV.

8. The process according to claim 7 wherein the total dosage is 3E15 ions/cm2.

* * * * *